United States Patent
Bilobrov (10) Patent No.: US 9,728,205 B2
(45) Date of Patent: Aug. 8, 2017

(54) GENERATING AUDIO FINGERPRINTS BASED ON AUDIO SIGNAL COMPLEXITY

(71) Applicant: Facebook, Inc., Menlo Park, CA (US)

(72) Inventor: Sergiy Bilobrov, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 355 days.

(21) Appl. No.: 13/833,719

(22) Filed: Mar. 15, 2013

(65) Prior Publication Data

US 2014/0277640 A1    Sep. 18, 2014

(51) Int. Cl.
G10L 25/00 (2013.01)
G06F 17/00 (2006.01)
G10L 25/54 (2013.01)
G10L 25/45 (2013.01)

(52) U.S. Cl.
CPC .............. *G10L 25/54* (2013.01); *G06F 17/00* (2013.01); *G10L 25/45* (2013.01)

(58) Field of Classification Search
CPC ......... G06F 17/30017; G06F 17/30743; G06F 17/30787; G10H 2250/135; G10L 15/142; G10L 25/00; G10L 25/03; G10L 25/18; G10L 25/45; G10L 25/54; H04H 60/37; H04H 60/58; H04H 60/59; H04L 29/06027; H04M 1/72527
USPC .................. 382/100, 124, 232, 233; 700/94; 704/270, 500; 707/E17.014; 709/230
See application file for complete search history.

(56) References Cited

U.S. PATENT DOCUMENTS

| | | | |
|---|---|---|---|
| 9,055,376 B1 * | 6/2015 | Postelnicu | H04R 3/00 |
| 2011/0314995 A1 * | 12/2011 | Lyon et al. | 84/609 |
| 2012/0102124 A1 * | 4/2012 | Hansson et al. | 709/206 |
| 2012/0209612 A1 * | 8/2012 | Bilobrov | 704/270 |

OTHER PUBLICATIONS

Khayam, S. A., "The Discrete Cosine Transform (DCT): Theory and Application," Department of Electrical & Computer Engineering, Michigan State University, Mar. 10, 2003, 32 Pages, can be retrieved at <http://www.tach.ula.ve/vermig/DCT_TR802.pdf>.

* cited by examiner

*Primary Examiner* — Paul McCord
*Assistant Examiner* — Alexander Eljaiek
(74) *Attorney, Agent, or Firm* — Fenwick & West LLP (57) ABSTRACT

An audio identification system accounts for an audio signal's complexity when generating a test audio fingerprint for identification of the audio signal. In particular, the audio identification system determines a complexity of an audio signal to be fingerprinted. For example, the audio signal's complexity may be determined by performance of an autocorrelation on the audio signal. Based on the determined complexity, the audio identification system determines a length of a sample of the audio signal used to generate a test audio fingerprint. A sample having the length is then obtained and used to generate a test audio fingerprint for the audio signal. The test audio fingerprint may be compared to a set of reference audio fingerprints to identify the audio signal.

20 Claims, 5 Drawing Sheets

GENERATING AUDIO FINGERPRINTS BASED ON AUDIO SIGNAL COMPLEXITY

BACKGROUND

This invention generally relates to audio identification, and more specifically to generating audio fingerprints based on audio signal complexity.

Real-time identification of audio signals is being increasingly used in various applications. For example, many systems use various audio signal identification schemes to identify the name, artist, and/or album of an unknown song. Currently, various audio signal identification schemes have been developed. In one class of schemes, an audio fingerprint is generated for an audio signal, where the audio fingerprint includes characteristic information about the audio signal usable for identifying the audio signal. The characteristic information about the audio signal may be based on acoustical and perceptual properties of the audio signal. To identify an audio signal, an audio fingerprint generated from the audio signal is compared to a database of reference audio fingerprints.

However, conventional audio identification schemes based on audio fingerprinting have a number of technical problems. For example, current techniques match audio fingerprints from audio signal samples of a specified length. The fingerprint should be long enough to ensure reliable fingerprint identification. Typically different test audio fingerprints have the same lengths regardless of the audio signals to be identified by the audio fingerprints. For example, a conventional technique generates an audio fingerprint from a 5-second sample of an audio signal regardless of the properties of the audio signal. In some instances, the length of the sample may be longer than necessary for an audio signal. For example, an audio signal may be complex and contain many characteristic features, so a 2-second sample may be sufficient to generate an audio fingerprint for reliably identifying the audio signal. However, because the conventional technique uses a 5-second sample for the audio fingerprint, unnecessary delays in identifying the audio signal may occur. In other instances, the length of the sample may be too short to identify an audio signal. For example, a 10-second sample may be needed to generate an audio fingerprint to identify a simple audio signal that does not contain many characteristic features. Hence, the 5-second sample used in the conventional technique may generate an audio fingerprint resulting in an unacceptably large number of false positives.

SUMMARY

To identify audio signals, an audio identification system generates one or more test audio fingerprints for one or more audio signals. A test audio fingerprint is generated by identifying a sample or portion of an audio signal. The sample may be comprised of one or more discrete frames each corresponding to different fragments of the audio signal. For example, a sample is comprised of 20 discrete frames each corresponding to 50 ms fragments of the audio signal. In the preceding example, the sample corresponds to a 1 second portion of the audio signal. Based on the sample, a test audio fingerprint is generated and matched to one or more reference audio fingerprints stored by the audio identification system. Each reference audio fingerprint may be associated with identifying and/or other related information. Thus, when a match between the test audio fingerprint and a reference audio fingerprint is identified, the audio signal from which the test audio fingerprint was generated is associated with the identifying and/or other related information corresponding to the matching reference audio fingerprint. For example, an audio signal is associated with name and artist information corresponding to a reference audio fingerprint matching a test audio fingerprint generated of the audio signal.

In one embodiment, test audio fingerprints are generated based on audio signal complexity. Specifically, the audio identification system determines the complexity of each audio signal for which a test audio fingerprint is to be generated. The audio identification system uses samples with varying lengths based on the complexities of the audio signals to generate test audio fingerprints for the different audio signals. In one embodiment, the length selected for a sample may be the minimum length of time determined by the audio identification system to enable reliable identification of a corresponding audio signal.

In one embodiment, the audio identification system performs an autocorrelation on an audio signal to determine the length of a sample for generating a test audio fingerprint for the audio signal. As used herein, "autocorrelation" refers to the cross-correlation of an audio signal with itself. Autocorrelation of the audio signal may be performed by comparing window fingerprints generated from shifted windows of consecutive frames of the audio signal, where each shifted window corresponds to different portions of the audio signal in time.

In particular, the audio identification system may receive a set of shifted windows of frames of the audio signal. For example, a first received window of frames may correspond to a portion of the audio signal between times $t_0$ and $t_1$ and a second received window of frames may correspond to a portion of the audio signal between times $t_1$ and $t_2$. From the windows, the audio identification system generates a set of window fingerprints and determines a complexity for the audio signal by comparing the window fingerprints. For example, the audio identification system determines how frequently certain audio characteristics of the audio signal are repeated based on the comparison. In one embodiment, an audio signal with more repeated audio characteristics is determined to have higher redundancy and therefore a low complexity. Conversely, for an audio signal with audio characteristics that are less correlated, the audio identification system determines the audio signal has higher complexity.

Based on the determined complexity of an audio signal, the audio identification system determines a length for a sample of the audio signal from which a test audio fingerprint is generated. For example, the audio identification system determines that samples of shorter lengths are used for fingerprinting audio signals determined to be more complex while longer length samples are used for fingerprinting audio signals determined to be less complex. Such is the case because more complex audio signals have greater characteristic variations relative to other audio signals. As such, identification of the audio signals can be performed more quickly.

After determining the sample length, the audio identification system selects a sample of the audio signal having the determined sample length or having approximately the determined sample length. A test audio fingerprint is generated from the selected sample. The generated test audio fingerprint may then be compared to a set of reference audio fingerprints to identify information associated with the audio signal. For example, a title, an artist, or other characteristics associated with a reference audio fingerprint matching the test audio fingerprint are associated with the audio signal. Information associated with the audio signal from the comparisons may be provided to a client device for display to a user, provided to a social networking system for display to users of the social networking system, or used for any other suitable purpose.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
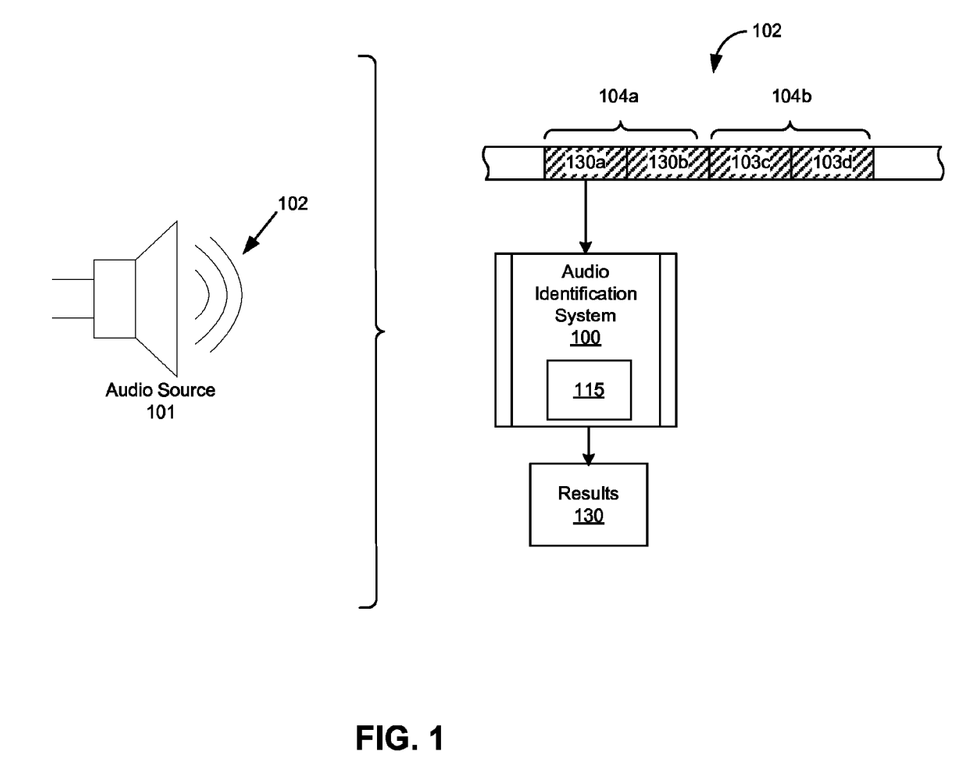
FIG. 1 is a block diagram of a process for identifying audio signals, in accordance with an embodiment of the invention.

Embodiments of the invention enable the accurate and rapid identification of audio signals based on one or more test audio fingerprints. FIG. 1 shows an example embodiment of an audio identification system 100 identifying an audio signal 102. As shown in FIG. 1, an audio source 101 generates an audio signal 102. The audio source 101 may be any entity suitable for generating audio (or a representation of audio), such as a person, an animal, speakers of a mobile device, a desktop computer transmitting a data representation of a song, or other suitable entity generating audio.

As shown in FIG. 1, the audio identification system 100 receives one or more discrete frames 103 of the audio signal 102. Each frame 103 may correspond to a fragment of the audio signal 102 at a particular time. For example, the frame 103a corresponds to a portion of the audio signal 102 between times $t_0$ and $t_1$. The frame 103b corresponds to a portion of the audio signal 102 between times $t_1$ and $t_2$. Hence, each frame 103 corresponds to a length of time of the audio signal 102, such as 25 ms, 50 ms, 100 ms, 200 ms, etc. Upon receiving the one or more frames 103, the audio identification system 100 generates a test audio fingerprint 115 for the audio signal 102 from a sample including one or more of the frames 103. The test audio fingerprint 115 may include characteristic information describing the audio signal 102. Such characteristic information may indicate acoustical and/or perceptual properties of the audio signal 102.

The audio identification system 100 matches the generated test audio fingerprint 115 against a set of candidate reference audio fingerprints. To match the test audio fingerprint 115 to a candidate reference audio fingerprint, a similarity score between the candidate reference audio fingerprint and the test audio fingerprint 115 is computed. The similarity score measures the similarity between the audio characteristics of a candidate reference audio fingerprint and the audio characteristics of a test audio fingerprint 115. In one embodiment, the test audio fingerprint 115 is determined to match a candidate reference audio fingerprint if a corresponding similarity score meets or exceeds a similarity threshold.

When a candidate reference audio fingerprint matches the test audio fingerprint 115, the audio identification system 100 retrieves identifying and/or other related information associated with the matching candidate reference audio fingerprint. For example, the audio identification system 100 retrieves artist, album, and title information associated with the matching candidate reference audio fingerprint. The retrieved identifying and/or other related information may be associated with the audio signal 102 and included in a set of search results 130 or other data for the audio signal 102.

In one embodiment, the audio identification system 100 determines a suitable length for the sample of the audio signal 102 used to generate the test audio fingerprint 115 by determining the complexity of the audio signal 102. In another embodiment, the audio identification system 100 determines a suitable length for the sample of the audio signal 102 by determining the complexity of a reference audio signal corresponding to a candidate reference audio fingerprint that matches an initial test audio fingerprint generated from a sample of the audio signal 102. For example, if the reference audio signal of the candidate reference fingerprint has low complexity, contains repeating patterns, and/or silent or quiet fragments, a subsequent test audio fingerprint may be generated for the audio signal 102. The subsequent test audio fingerprint may be based on a longer sample of the audio signal 102 than the sample used to generate the initial test audio fingerprint. Since the subsequent test audio fingerprint is based on a sample of longer length, it can be used to more reliably identify the audio signal 102.

In one embodiment, the complexity of an audio signal (e.g., the audio signal 102) may be based on an analysis of certain signal properties of the audio signal, such as signal randomness, entropy, spectral flatness, modulation parameters and presence of repeating elements and patterns.

In one embodiment, the complexity of the audio signal 102 is determined by performing an autocorrelation of the audio signal 102. Referring to FIG. 1, the audio identification system 110 performs an autocorrelation by selecting the windows 104a and 104b of the audio signal 102. Each window includes a different set of frames 103. For example, the window 104a includes the frames 103a and 103b. In contrast, the window 104b includes the frames 103c and 103d. After selecting the windows 104a and 104b, the audio identification system 100 generates a window fingerprint based on the window 104a, and generates an additional window fingerprint based on the additional selected window 104b. The audio identification system 110 performs a comparison between the window fingerprint 104a and the additional window fingerprint 104b. If a match is found (e.g., a similarity score between the widow fingerprint 104a and the additional window fingerprint 104b meets at least a threshold similarity score), the audio identification system 100 generates additional window fingerprints for additional windows 104 corresponding to subsequent portions of the audio signal 102, and compares the additional window fingerprints to the initial window fingerprint until a match is not found. If a match is not found, the audio identification system 100 determines a complexity of the audio signal 102 based on the non-matching. For example, the audio identification system 100 determines, based on the non-matching, that certain audio characteristics of the audio signal 102 repeat relatively frequently, and determines, as a result, that the audio signal 102 has a low complexity.

After identifying a non-match, the audio identification system 100 determines a sample length for a sample of the audio signal 102 used to generate the test fingerprint 115 based on the determined complexity of the audio signal 102. For example, if the audio signal 102 is relatively complex, the audio identification system 100 selects a relatively short sample length. In contrast, if the audio signal is not particularly complex, the audio identification system 100 selects a relatively long sample length.

The audio identification system 100 obtains a sample of the audio signal 102 based on the determined sample length. For example, the audio identification system 100 obtains a portion of the audio signal 102 having the determined sample length. From the obtained sample, a test audio fingerprint 115 is generated. In one embodiment, the obtained sample includes one or more of the frames 103. For example, each frame 103 corresponds to a 50 ms second fragment of the audio signal 102, and the determined sample length is 1 second of the audio signal 102. Thus, 20 of the frames 103 are used to generate the test audio fingerprint 115.

Determining sample lengths based on audio signal complexity allows the audio identification system 100 to more accurately identify received audio signals. Specifically, for more complex audio signals, the audio identification system 100 uses shorter length samples for generating test audio fingerprints, which reduce delays associated with obtaining samples and generating test audio fingerprints. This allows for more rapid identification of an audio signal by the audio identification system 100. For less complex audio signals, the audio identification system 100 uses longer sample lengths to generate test audio fingerprints. This allows the audio identification system 100 to reduce false positives related to test audio fingerprints having inadequate audio characteristic information for corresponding audio signals. As a result, audio signal identification can be performed more accurately.

In one embodiment, the audio identification system 100 adjusts a similarity threshold for determining matches between test audio fingerprints and candidate reference audio fingerprints according to a complexity and/or length of the audio signal samples corresponding to the fingerprints. For example, the audio identification system 100 uses lower similarity thresholds for audio fingerprints based on longer and more complex audio signal samples, and higher similarity thresholds for audio fingerprints based on for shorter and less complex audio signal samples.

System Architecture

Figure 2A:
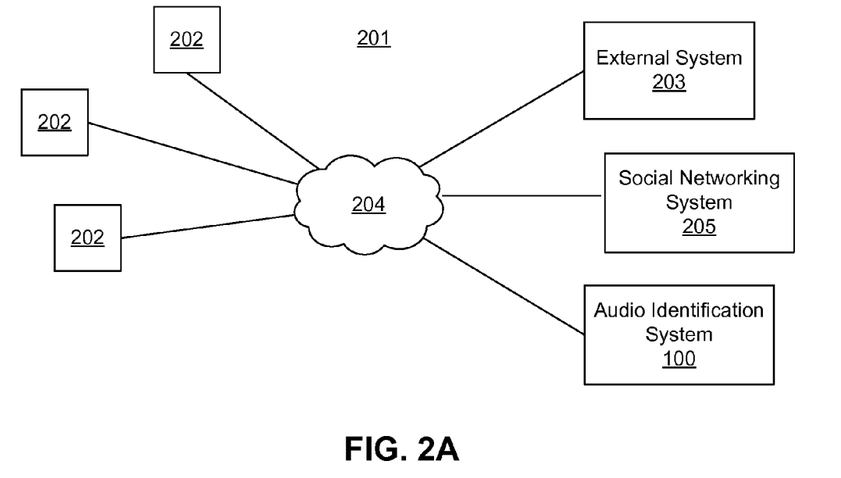
FIG. 2 is a block diagram of an audio identification system, in accordance with an embodiment of the invention.

FIG. 2A is a block diagram illustrating one embodiment of a system environment 201 including an audio identification system 100. As shown in FIG. 2A, the system environment 201 includes one or more client devices 202, one or more external systems 203, the audio identification system 100, a social networking system 205, and a network 204. While FIG. 2A shows three client devices 202, one social networking system 205, and one external system 203, it should be appreciated that any number of these entities (including millions) may be included. In alternative configurations, different and/or additional entities may also be included in the system environment 201.

A client device 202 is a computing device capable of receiving user input, as well as transmitting and/or receiving data via the network 204. In one embodiment, a client device 202 sends a request to the audio identification system 100 to identify an audio signal captured or otherwise obtained by the client device 202. The client device 202 may additionally provide the audio signal or a digital representation of the audio signal to the audio identification system 100. Examples of client devices 202 include desktop computers, laptop computers, tablet computers (pads), mobile phones, personal digital assistants (PDAs), gaming devices, or any other device including computing functionality and data communication capabilities. Hence, the client devices 202 enable users to access the audio identification system 100, the social networking system 205, and/or one or more external systems 203. In one embodiment, the client devices 202 also allow various users to communicate with one another via the social networking system 205.

The network 204 may be any wired or wireless local area network (LAN) and/or wide area network (WAN), such as an intranet, an extranet, or the Internet. The network 204 provides communication capabilities between one or more client devices 202, the audio identification system 100, the social networking system 205, and/or one or more external systems 203. In various embodiments the network 204 uses standard communication technologies and/or protocols. Examples of technologies used by the network 204 include Ethernet, 802.11, 3G, 4G, 802.16, or any other suitable communication technology. The network 204 may use wireless, wired, or a combination of wireless and wired communication technologies. Examples of protocols used by the network 204 include transmission control protocol/Internet protocol (TCP/IP), hypertext transport protocol (HTTP), simple mail transfer protocol (SMTP), file transfer protocol (TCP), or any other suitable communication protocol.

The external system 203 is coupled to the network 204 to communicate with the audio identification system 100, the social networking system 205, and/or with one or more client devices 202. The external system 203 provides content and/or other information to one or more client devices 202, the social networking system 205, and/or to the audio identification system 100. Examples of content and/or other information provided by the external system 203 include identifying information associated with reference audio fingerprints, content (e.g., audio, video, etc.) associated with identifying information, or other suitable information.

The social networking system 205 is coupled to the network 204 to communicate with the audio identification system 100, the external system 203, and/or with one or more client devices 202. The social networking system 205 is a computing system allowing its users to communicate, or to otherwise interact, with each other and to access content. The social networking system 205 additionally permits users to establish connections (e.g., friendship type relationships, follower type relationships, etc.) between one another.

In one embodiment, the social networking system 205 stores user accounts describing its users. User profiles are associated with the user accounts and include information describing the users, such as demographic data (e.g., gender information), biographic data (e.g., interest information), etc. Using information in the user profiles, connections between users, and any other suitable information, the social networking system 205 maintains a social graph of nodes interconnected by edges. Each node in the social graph represents an object associated with the social networking system 205 that may act on and/or be acted upon by another object associated with the social networking system 205. Examples of objects represented by nodes include users, non-person entities, content items, groups, events, locations, messages, concepts, and any other suitable information. An edge between two nodes in the social graph represents a particular kind of connection between the two nodes. For example, an edge corresponds to an action performed by an object represented by a node on another object represented by another node. For example, an edge may indicate that a particular user of the social networking system 205 is currently "listening" to a certain song. In one embodiment, the social networking system 205 may use edges to generate stories describing actions performed by users, which are communicated to one or more additional users connected to the users through the social networking system 205. For example, the social networking system 205 may present a story that a user is listening to a song to additional users connected to the user.

Figure 2B:
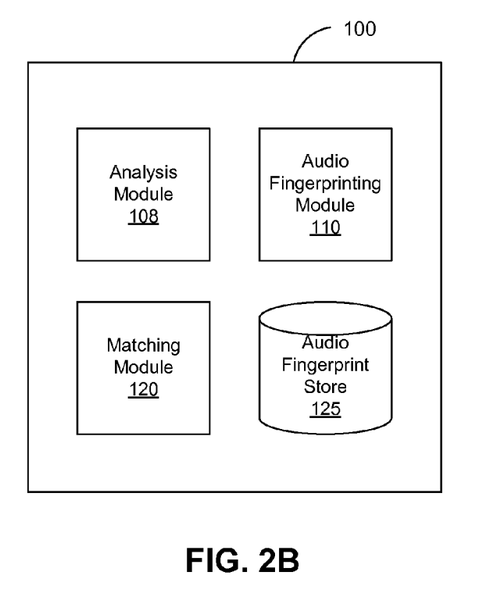

The audio identification system 100, further described below in conjunction with FIG. 2B, is a computing system configured to identify audio signals. FIG. 2B is a block diagram of one embodiment of the audio identification system 100. In the embodiment shown by FIG. 2B, the audio identification system includes an analysis module 108, an audio fingerprinting module 110, a matching module 120, and an audio fingerprint store 125.

The audio fingerprint store 125 stores one or more reference audio fingerprints, which are audio fingerprints generated from one or more reference audio signals by the audio identification system 100 or by another suitable entity. Each reference audio fingerprint in the audio fingerprint store 125 is also associated with identifying information and/or other information related to the audio signal from which the reference audio fingerprint was generated. The identifying information may be any data suitable for identifying an audio signal. For example, the identifying information associated with a reference audio fingerprint includes title, artist, album, publisher information for the corresponding audio signal. As another example, identifying information may include data indicating the source of an audio signal corresponding to a reference audio fingerprint. As specific examples, the identifying information may indicate that the source of a reference audio signal is a particular type of automobile or may indicate the location from which the reference audio signal corresponding to a reference audio fingerprint was broadcast. For example, the reference audio signal of an audio-based advertisement may be broadcast from a specific geographic location, so a reference audio fingerprint corresponding to the reference audio signal is associated with an identifier indicating the geographic location (e.g., a location name, global positioning system (GPS) coordinates, etc.).

In one embodiment, the audio fingerprint store 125 associates an index with each reference audio fingerprint. Each index may be computed from a portion of the corresponding reference audio fingerprint. For example, a set of bits from a reference audio fingerprint corresponding to low frequency coefficients in the reference audio fingerprint may be used as the reference audio fingerprint's index The analysis module 108 analyzes audio signals. In one embodiment, the analysis module may modify the audio signals based on the analysis. The analysis module 108 determines a length of a sample of an audio signal used to generate a test audio fingerprint corresponding to the audio signal. In one embodiment, the length of the sample is based on a determined complexity of the audio signal from which the sample is obtained. To determine the complexity of the audio signal, the analysis module 108 performs an autocorrelation on the audio signal and identifies characteristics of the audio signal indicative of complexity from the autocorrelation. Based on the identified characteristics, the length of the sample is determined.

The audio fingerprinting module 110 generates audio fingerprints for audio signals using any suitable audio fingerprinting algorithm. In one embodiment, the audio fingerprinting module 110 generates test fingerprints for different audio signals using samples of different lengths. The length of a sample obtained from an audio signal may be determined by the analysis module 108.

The matching module 120 matches test audio fingerprints generated from audio signals to reference audio fingerprints to identify the audio signals. In particular, the matching module 120 identifies one or more candidate reference audio fingerprints from the audio fingerprint store 125 for comparing to a test audio fingerprint generated from an audio signal, and compares the identified candidate reference audio fingerprints to the test audio fingerprint. For a candidate reference audio fingerprint matching the generated test audio fingerprint, the matching module 120 retrieves identifying information associated with the matching candidate reference audio fingerprint from the audio fingerprint store 125, from the external systems 203, from the social networking system 205, and/or from any other suitable entity. The identifying information may be used to identify the audio signal from which the test audio fingerprint was generated.

In other embodiments, any of the described functionalities of the audio identification system 100 may be performed by the client devices 102, the external system 203, the social networking system 205, and/or any other suitable entity. For example, the client devices 102 may be configured to determine a suitable length for a sample for fingerprinting, generate a test fingerprint usable for identifying an audio signal, and/or determine identifying information for an audio signal. In some embodiments, the social networking system 205 and/or the external system 203 may include the audio identification system 100.

Figure 3A:
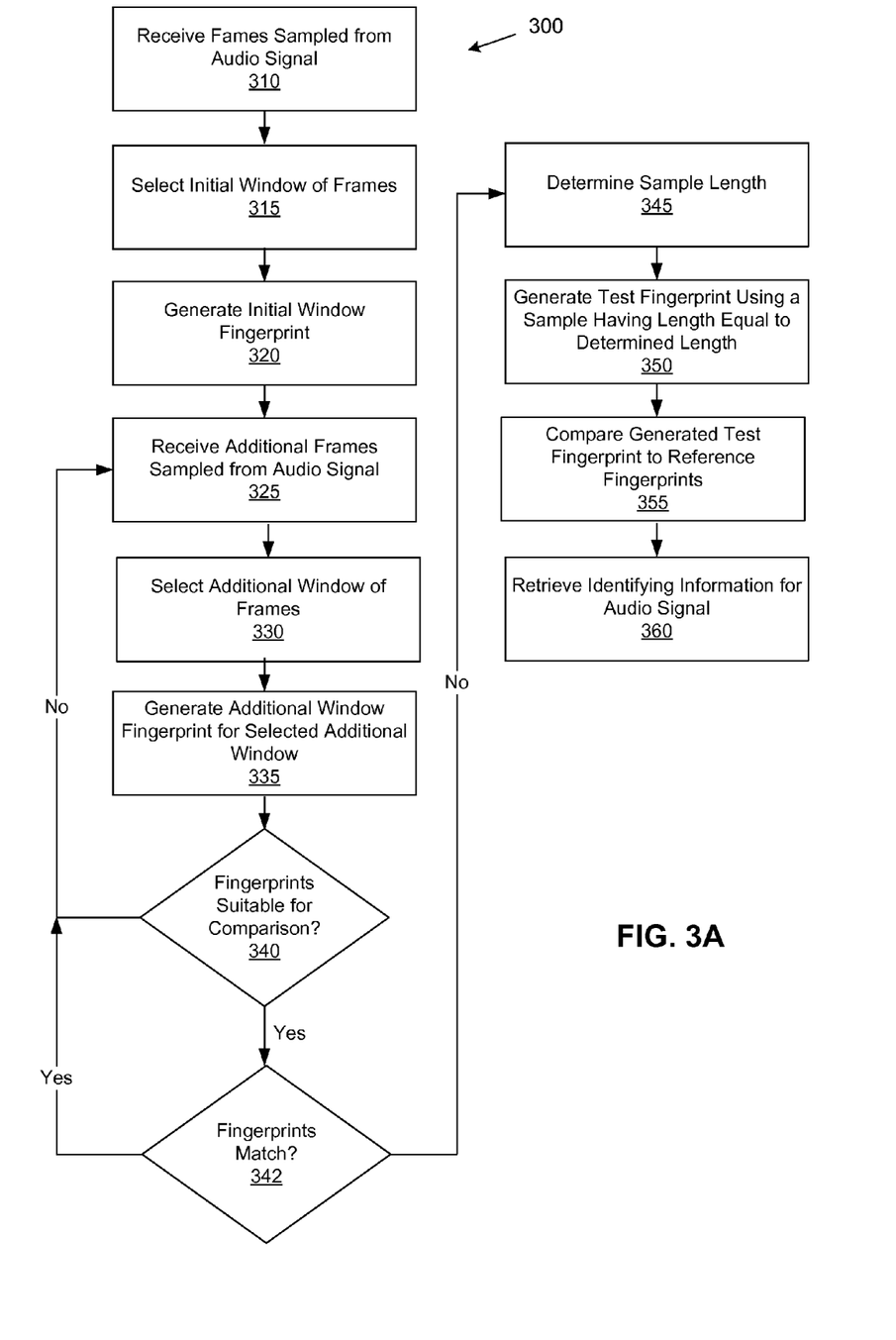
FIG. 3A is a flow chart of a process for determining a length for a sample of an audio signal, in accordance with an embodiment of the invention.

Determining a Length of a Sample of an Audio Signal for Audio Fingerprint Generation FIG. 3A illustrates a flow chart of one embodiment of a process 300 for determining a length for a sample of an audio signal for generating an audio fingerprint. Other embodiments may perform the steps of the process 300 in different orders and may include different, additional and/or fewer steps. The process 300 may be performed by any suitable entity, such as the analysis module 108, the audio fingerprinting module 110, and the matching module 120.

The audio fingerprinting module 110 receives 310 a sequence of multiple frames 103 sampled from an audio signal 102. The audio identification system 100 may receive 310 the one or more frames 103 during an audio signal identification procedure initiated automatically or initiated responsive to a request from a client device 202. In one aspect, each of the received frames 103 may correspond to a fragment of the audio signal 102 for a length of time, such as such as 25 ms, 50 ms, 100 ms, or 200 ms. The frames 103 may be received 310 from any suitable source. For example, the frames 103 are streamed from the client device 202 via the network 204. As another example, the frames 103 are retrieved from an external system 203 via the network 204.

While receiving 310 the frames 103, the audio fingerprinting module 110 selects 315 an initial window 104*a* comprising one or more consecutive frames from the multiple frames 103. The initial window 104a may have any suitable length. For example, the initial window 104a may be 0.25 seconds, 0.50 seconds, 1 second, or 2 seconds in length. Hence, the initial window 104a may include a number of frames 103 having an aggregate length equaling the length of the initial window 104a. For example, if the initial window 104a is 1 second in length and each frame 103 is 50 ms in length, the initial window 104a may include 20 frames.

Based on the frames included in the initial window 104a, the audio fingerprinting module 110 generates 320 an initial window fingerprint. To generate the initial window fingerprint, the audio fingerprinting module 110 converts each frame 103 in the initial window 104a from the time domain to the frequency domain and computes power spectrum information corresponding to a power spectrum for each frame 103 over a range of frequencies, such as 250 to 2250 Hz. The power spectrum for each frame 103 is then split into a number of frequency bands within the range. For example, the power spectrum of each frame 103 is split into 16 different bands within the frequency range of 250 and 2250 Hz. To split the power spectrum, the audio fingerprinting module 110 applies a number of band-pass filters to the power spectrum of each frame 103. Each band-pass filter isolates a fragment of the audio signal 102 corresponding to a frame 103 for a particular frequency band. By applying the band-pass filters, multiple sub-band samples corresponding to different frequency bands are generated.

The audio fingerprinting module 110 resamples each sub-band sample to produce a corresponding resample sequence. Any suitable type of resampling may be performed to generate a resample sequence. In one embodiment, each resample sequence of each frame 103 is stored by the audio fingerprinting module 110 as a [M×T] matrix, which corresponds to a sampled spectrogram having a time axis and a frequency axis for a particular frequency band.

A transformation is performed on the generated spectrograms for the frequency bands. In one embodiment, the audio fingerprinting module 110 applies a two-dimensional Discrete Cosine Transform (2D DCT) to the spectrograms. To perform the transform, the audio fingerprinting module 110 normalizes the spectrogram for each frequency band of each frame 103 and performs a one-dimensional DCT along the time axis of each normalized spectrogram. Subsequently, the audio fingerprinting module 110 performs a one-dimensional DCT along the frequency axis of each normalized spectrogram.

Application of the 2D DCT generates a set of feature vectors for the frequency bands of each frame 103 in the initial window 104a. Based on the feature vectors for each frame 103, the audio fingerprinting module 110 generates 320 an initial window fingerprint for the audio signal 102. In one embodiment, the initial window fingerprint is generated 320, in part, by quantizing the feature vectors for each frame 103 to produce a set of coefficients that each has one of a value of −1, 0, or 1.

After generating 320 the initial window fingerprint, the audio fingerprinting module 110, in conjunction with the analysis module 108, performs one or more rounds of processing to identify an additional window 104 associated with an additional window fingerprint matching the initial window fingerprint of the initial window 104a.

Figure 3B:
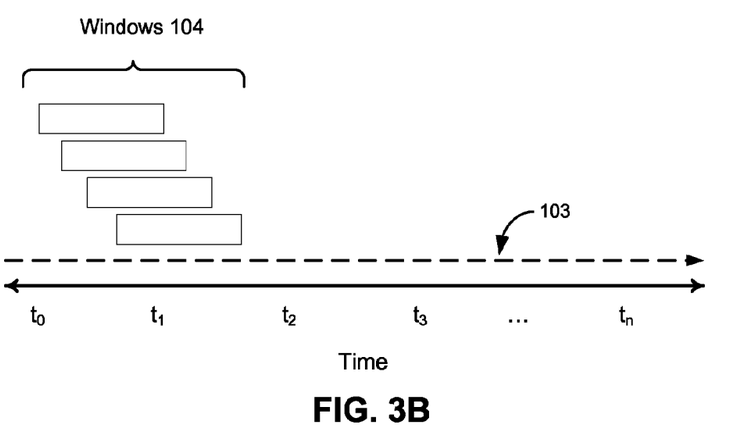
FIG. 3B is a diagram of an example of a set of selected shifted windows of an audio signal, in accordance with an embodiment of the invention.

In an individual round of processing, the audio fingerprinting module 110 receives 325 additional frames 103 sampled from the audio signal 102 and selects 330 an additional window 104 including a set of consecutive frames 103 of the audio signal 102. In one aspect, the additional selected window includes a set of frames 103 that is shifted by one frame 103 in time from an immediately preceding window. For example, the audio fingerprinting module 110 receives a sequence of frames numbered from 0 to 100 and selects 330 a first window corresponding to frames 0 to 99. The audio fingerprinting module 110 additionally selects a second window corresponding to frames 1 to 100. FIG. 3B, shows an example of windows selected 330 by the audio fingerprinting module 110 over several processing rounds. In particular, FIG. 3B shows 4 windows selected by the audio fingerprinting module 110. As shown in FIG. 3B, each window 104 is shifted by 1 frame from a previous window 104.

In one embodiment, for the selected additional window 104, the audio fingerprinting module 110 generates 335 an additional window fingerprint for the additional window 104. In one embodiment, the additional window fingerprint is generated 335 in a manner similar to generation of the initial window fingerprint described above. Alternatively, generating 335 the additional window fingerprint for a window 104 may leverage window fingerprinting performed for a previous window 104. For example, if consecutive windows 104 are shifted by one frame, a current window and its preceding window share all but two frames 103; accordingly, the results of the fingerprint generation for an immediately preceding window may be leveraged to generate a window fingerprint for the current window 104. Specifically, the audio fingerprinting module 110 may retrieve the processing results (e.g., feature vectors) for those frames 103 included in both the current window 104 and in the immediately preceding window 104. The audio fingerprinting module 110 also generates processing results (e.g., feature vectors) for the frame 103 in the current window 104 not included in the immediately preceding window 104. A window fingerprint for the current window 104 is then generated by combining the results of the processing performed on the non-overlapping frame 103 with the results of the previously performed processing of the frames overlapping between consecutive the windows. This allows more efficient generation of window fingerprints.

Subsequently, the analysis module 108 determines 340 whether the additional window fingerprint of the additional window 104 is suitable for comparison to the initial fingerprint of the initial window 104a. The analysis module 108 makes such a determination by determining whether the additional window 104 and the initial window 104a have less than a threshold number of overlapping frames 103. In particular, comparison of window fingerprints of windows 104 that include overlapping frames 103 may skew determination of audio signal complexity since those frames 103 overlapping between the windows 104 represent the same audio signal fragments. Hence, the analysis module 108 prevents the window fingerprints of additional windows 104 including at least a threshold number of frames overlapping with the initial window 104a from being compared to the initial window fingerprint.

If it is determined 340 that the additional window 104 is not suitable for comparison to the initial window 104a, another round of processing is performed including the receipt 325 of subsequent additional frames, selection 330 of a subsequent additional window, etc. In one aspect, the subsequent additional window may be shifted one frame in time from the window currently being processed.

If it is determined 340 that the additional window 104 and the initial window 104a are suitable for comparison, the analysis module 108 determines 342 whether the additional window fingerprint for the selected additional window 104 matches the initial window fingerprint. Such a determination is considered an autocorrelation performed on the audio signal 102 as the audio signal 102 is compared with itself. Any suitable algorithm for comparing the additional window fingerprint with the initial window fingerprint may be used. In one embodiment, the analysis module 108 generates a similarity score for the initial window fingerprint with respect to the additional window fingerprint. For example, the similarity score is a bit error rate (BER) computed for the initial window audio fingerprint and the additional window fingerprint. The BER between two fingerprints is the percentage of their corresponding bits that do not match. The expected BER between two unrelated, random window fingerprints is 50%. In one embodiment, two window fingerprints are determined 342 to match if the BER between the two is less than 35%; however, other threshold values may be used depending on the desired tolerance for false positives and/or false negatives.

If the selected additional window fingerprint 104 is determined 342 to match the initial window fingerprint, another round of processing is performed with the receipt 325 of subsequent additional frames, selection 330 of a subsequent additional window, etc.

If the selected additional window fingerprint 104 and the initial window fingerprint do not match, the analysis module 108 determines 345 a sample length for a sample of the audio signal 102 used to generate a test audio fingerprint 115 for the audio signal 102.

Figure 3C:
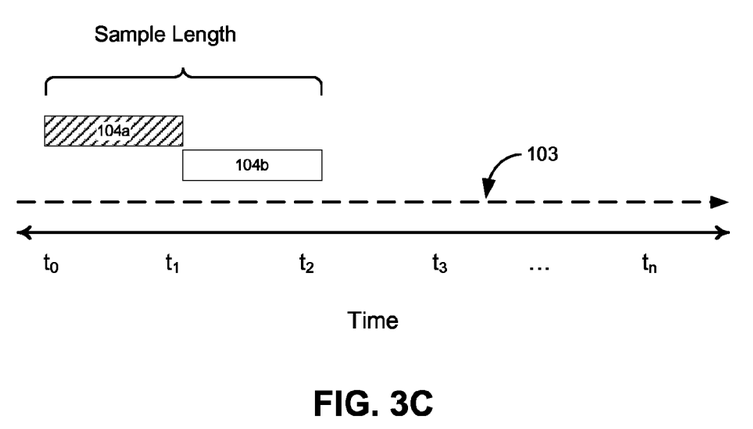
FIG. 3C is a diagram of an example determination of a length for a sample of an audio signal, in accordance with an embodiment of the invention.

In one embodiment, the analysis module 108 determines 345 a sample length equal to the length of a time period between the start of the initial window 104a and the end of the additional window 104 associated with the additional window fingerprint matching the initial window fingerprint. As an example, FIG. 3C shows the initial window 104a and a consecutive additional window 104b associated with an additional window fingerprint that does not match the initial window fingerprint. In particular, window 104a may include a set of audio characteristics A. The window 104b may include a set of different audio characteristics B. In FIG. 3C, the windows 104a and 104b may each correspond to a 1-second portion of the audio signal 102, so the sample length is determined 345 to be the aggregate length of the windows 104a and 104b, which is 2 seconds.

Figure 3D:
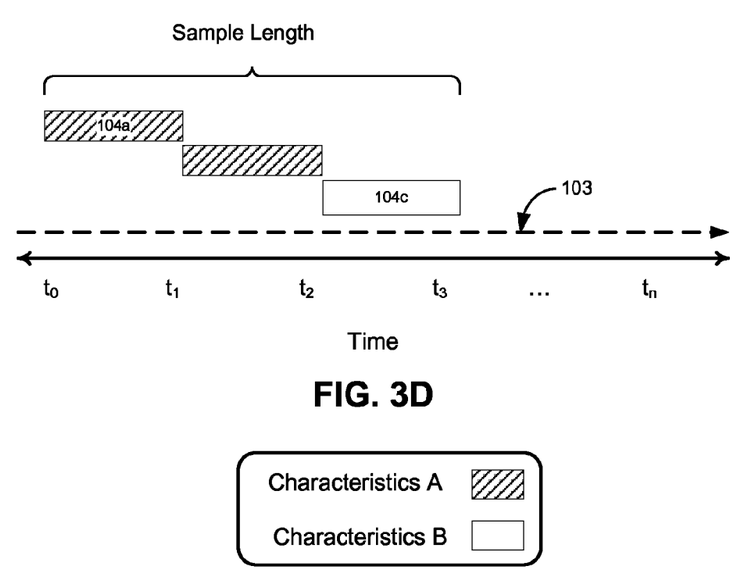
FIG. 3D is a diagram of another example determination of a length for a sample of an audio signal, in accordance with an embodiment of the invention.

As another example, FIG. 3D shows the initial window 104a and an additional window 104c associated with an additional window fingerprint that does not match the initial window fingerprint. In particular, window 104a may include a set of audio characteristics A. The window 104c may include a set of different audio characteristics B. The windows 104a, and 104c may each correspond to a 1-second portion of the audio signal 102. As shown, the initial window 104a corresponds to a portion of the audio signal 102 between times $t_0$ and $t_1$. The additional window 104c corresponds to a portion of the audio signal 102 between times $t_2$ and $t_3$. Hence, in the example of FIG. 3D, the sample length is the length of time from the start of the initial window, $t_0$, to the end of the additional window 104c, $t_3$ (i.e. 3 seconds).

Matching between an additional window fingerprint and the initial window fingerprint indicates that certain audio characteristics of the audio signal 102 are repeating. Since the portions of the audio signal 102 of the initial window 104a and the additional window 104 include the same audio information, it is likely that there is insufficient information for generating a suitable test audio fingerprint 115 for identifying the audio signal 102.

Referring again to FIG. 3A, after determining 345 the sample length, the analysis module 108 communicates the sample length to the audio fingerprinting module 110, which generates 350 a test audio fingerprint 115 for the audio signal 102 using a sample having the determined sample length. In one embodiment, the audio fingerprinting module 110 generates 350 the test audio fingerprint 115 by combining the previously generated window fingerprints in a suitable manner. For example, the audio fingerprinting module 110 combines the initial window fingerprint, the matching additional window fingerprint, and any other suitable window fingerprints. In other embodiments, the fingerprinting module 110 generates 350 the test fingerprint 115 by obtaining a sample of the audio signal 102 having the same duration as the time between the start of the initial window 104a and the end of the selected additional window 104 having a window fingerprint matching the initial window fingerprint. The obtained sample is then used to generate 350 the test audio fingerprint 115 in a manner similar to generation of the initial window fingerprint.

The audio fingerprinting module 110 provides the generated test audio fingerprint 115 to the matching module 120, which compares 355 the generated test audio fingerprint 115 to a set of candidate reference audio fingerprints. For example, the matching module 120 matches the test audio fingerprint 115 with the indices for the reference audio fingerprints in the audio fingerprint store 125. Reference audio fingerprints having an index matching the test audio fingerprint 115 are identified as candidate reference audio fingerprints. The test fingerprint 115 is then compared to one or more of the candidate reference audio fingerprints. In one embodiment, a similarity score between the test audio fingerprint 115 and each candidate reference audio fingerprint is computed. Based on the similarity scores, matches between the test audio fingerprint 115 and the candidate reference audio fingerprints are identified. In one embodiment, matching of the test audio fingerprint 115 to a candidate reference audio fingerprint may be performed in a manner similar to the determination of whether the initial window fingerprint matches an additional window fingerprint.

The matching module 120 retrieves 360 identifying information associated with one or more candidate reference audio fingerprints matching the test audio fingerprint 115. The identifying information may be retrieved 360 from the audio fingerprint store 125, one or more external systems 203, and/or any other suitable entity. The identifying information may be included in results provided by the matching module 115. For example, the identifying information is included in results sent to a client device 202 that initially requested identification of the audio signal 102. The identifying information allows a user of the client device 202 to determine information related to the audio signal 102. For example, the identifying information indicates that the audio signal 102 is produced by a particular device or indicates that the audio signal 102 is a song with a particular title, artist, or other information.

In one embodiment, the matching module 115 provides the identifying information to the social networking system 205 via the network 204. The matching module 115 may additionally provide an identifier for determining a user associated with the client device 202 from which a request to identify the audio signal 102 was received. For example, the identifying information provided to the social networking system 205 indicates a user profile of the user maintained by the social networking system 205. The social networking system 205 may update a user's user profile to indicate the user is currently listening to a song identified by the identifying information. In one embodiment, the social networking system 205 may communicate the identifying information to one or more additional users connected to the user requesting identification of the audio signal 102 over the social networking system. For example, additional users connected to the user that requested identification of the audio signal 102 may receive content identifying the user and identifying information for the audio signal 102. The social networking system 205 may communicate the identifying information to users using a story that is included in a newsfeed presented to the additional users connected to the user requesting identification of the audio signal 102.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
using a computer processor to perform steps comprising:
selecting an initial window of one or more frames from a plurality of frames of an audio signal stored in a memory of an audio identification system, each frame representing a portion of the audio signal;
generating an initial window fingerprint based on the initial window;
selecting an additional window of one or more frames from the plurality of frames, at least one frame of the additional window being different and non-overlapping in time with a frame inducted in the initial window;
generating an additional window fingerprint based on the additional window;
determining a similarity score between the initial window fingerprint and the additional window fingerprint;
responsive to the similarity score at least meeting a threshold corresponding to a match, increasing a length of a sample of the audio signal;
generating a test audio fingerprint of the audio signal from the sample of the audio signal having the increased length;
comparing, by the audio identification system, the test audio fingerprint to a set of reference audio fingerprints stored in a database of the audio identification system.

2. The computer-implemented method of claim 1, wherein the length for the sample of the audio signal is based on a time period between a first frame of the initial window of one or more frames and a final frame of the additional window of one or more frames.

3. The computer-implemented method of claim 1, wherein determining the length for the sample of the audio signal based on the initial window and the additional window comprises:
computing the length for the sample based on a starting time of the initial window and an ending time of the additional window.

4. The computer-implemented method of claim 1, further comprising:
receiving, from a client device external from the audio identification system, a request to match the audio signal to an audio signal stored by the audio identification system; and
determining identifying information associated with the audio signal based on the comparison between the test audio fingerprint and the set of reference audio fingerprints.

5. The computer-implemented method of claim 1, wherein generating the initial window fingerprint comprises applying a two dimensional discrete cosine transform (2D DCT) to the initial window of one or more frames.

6. A computer-implemented method comprising:
using, a computer processor to perform steps comprising:

selecting, by an audio identification system, an initial window of one or more initial frames of an audio signal, each frame corresponding to a portion of the audio signal;

generating an initial window fingerprint based on the initial window;

selecting an additional window of one or more additional frames of the audio signal, wherein a portion of the audio signal included in the additional window is different and not overlapping in time with a portion of the audio signal included in the initial window;

generating an additional window fingerprint based on the additional window, the one or more initial frames of the initial window and the one or more additional frames of the additional window corresponding to an initial sample length of the audio signal;

determining a similarity score between the initial window fingerprint and the additional window fingerprint;

responsive to the similarity score at least meeting a threshold, increasing the initial sample length of the audio signal to an increased sample, length;

generating a test audio fingerprint of the audio signal using the increased sample length of the audio signal;

comparing the test audio fingerprint to one or more reference audio fingerprints stored in a database of the audio identification system; and responsive to the test audio fingerprint matching a reference audio fingerprint, associating the audio signal with identifying information associated with the reference audio fingerprint.

7. The computer-implemented method of claim 6, further comprising:
associating the identifying information with a user of a social networking system; and
describing the user and the identifying information to one or more additional users of the social networking system connected to the user.

8. The computer-implemented method of claim 7, wherein describing the user and the identifying information comprises:
generating, a story indicating, that a user is listening to audio associated with the identifying information; and
providing the generated story to the one or more additional users connected to the user.

9. The computer-implemented method of claim 8, wherein the generated story is included in a newsfeed presented to at least one of the one or more additional users.

10. The computer-implemented method of claim 7, wherein describing the user and the identifying information comprises:
generating a story indicating that a user is at a location associated with the identification information; and
providing the generated story to the one or more additional users connected to the user.

11. The computer-implemented method of claim 1, wherein determining a length for a sample of the audio signal comprises:
determining a complexity of the audio signal; and
determining a length for a sample of the audio signal based on the determined complexity of the audio signal.

12. The computer-implemented method of claim 11, wherein a portion of the audio signal having a shorter determined sample length is determined to be more complex than a portion of the audio signal having a longer determined sample length.

13. The computer-implemented method of claim 11, wherein determining the complexity of the audio signal comprises:
determining a complexity of the audio signal based at least in part on frequency of occurrence of a predefined plurality of audio characteristics of the audio signal, a higher frequency of one or more predefined plurality of audio characteristics indicating a lower complexity.

14. The computer-implemented method of claim 11, wherein determining the complexity of audio signal further comprises:
determining whether the initial window matches the additional window, wherein the complexity of the audio signal is determined in response to the initial window not matching the additional window.

15. The computer-implemented method of claim 1, wherein determining the similarity score includes:
comparing audio characteristics of the audio signal in the initial window to audio characteristics of the audio signal in the additional window, the audio characteristics comprising one or more from the group of: a repeating pattern, a silent portion, signal randomness, signal entropy, spectral flatness, one or more modulation parameters, or any combination thereof.

16. The computer-implemented method of claim 1, wherein the similarity score corresponds to a complexity of audio characteristics of the audio signal, wherein a high similarity score is indicative of a lower complexity and a low similarity score that is indicative of a higher complexity.

17. The computer-implemented method of claim 6, wherein determining the similarity score includes:
comparing audio characteristics of the audio signal in the initial window to audio characteristics of the audio signal in the additional window, the audio characteristics comprising one or more from the group of: a repeating pattern, a silent portion, signal randomness, signal entropy, spectral flatness, one or more modulation parameters, or any combination thereof.

18. The computer-implemented method of claim 6, wherein the similarity score corresponds to a complexity of audio characteristics of the audio signal, wherein a high similarity score is indicative of a lower complexity and a low similarity score that is indicative of a higher complexity.

19. A non-transitory computer readable storage medium storing one or more programs, the one or more programs comprising instructions that, when executed by a processor, cause the processor to:
select a first window of a first set of frames from a plurality of frames of an audio signal stored in a memory, each frame of the plurality of frames representing a portion of the audio signal;
generate a first fingerprint for the first window of the audio signal;
select a second window of a set of second frames from the plurality of frames, at least one frame of the second window being different compared to the first set of frames of the first window;
generate a second window fingerprint for the second window of the audio signal;
determine a first similarity score between the first window fingerprint and the second window fingerprint;
responsive to first similarity score at least meeting a threshold, select a third window of a third set of frames from the plurality of frames, at least one frame of third window being different compared to the first set of frames included in the first window and the second set of frames included in the second window;

generate a third window fingerprint for the third window of the audio signal;

determine a second similarity score between the first window fingerprint and the third window fingerprint; and responsive to second similarity score being below the threshold, generate a test audio fingerprint of the audio signal from a sample of the audio signal having a length corresponding to the first set of frames, the second set of frames, and the third set of frames of the plurality of frames of the audio signal.

20. The non-transitory computer readable storage medium of claim 19, wherein the length for the sample of the audio signal is based on a time period between a first frame of the first window of the first set of frames and a final frame of the third window of the third set of frames.

\* \* \* \* \*

UNITED STATES PATENT AND TRADEMARK OFFICE
CERTIFICATE OF CORRECTION

PATENT NO. : 9,728,205 B2
APPLICATION NO. : 13/833719
DATED : August 8, 2017
INVENTOR(S) : Sergiy Bilobrov Page 1 of 1

It is certified that error appears in the above-identified patent and that said Letters Patent is hereby corrected as shown below:

In the Claims

Column 14, Line 46, Claim 3 after "wherein" delete "determining" and insert -- increasing --.
Column 14, Line 67, Claim 6 after "using" delete ",".
Column 15, Line 22, Claim 6 after "increased sample" delete ",".
Column 15, Line 42, Claim 8 after "generating" delete ",".
Column 15, Line 42, Claim 8 after "indicating" delete ",".
Column 15, Line 53, Claim 10 after "the" delete "identification" and insert -- identifying --.
Column 15, Line 57, Claim 11 after "wherein" delete "determining" and insert -- increasing --.
Column 15, Line 60, Claim 11 delete "determining a" and insert -- increasing the --.
Column 15, Line 64-65, Claim 12 after "a shorter" delete "determined".
Column 15, Line 66-67, Claim 12 after "a longer" delete "determined".
Column 16, Line 4, Claim 13 after "determining" delete "a" and insert -- the --.
Column 16, Line 10, Claim 14 after "complexity of" insert -- the --.
Column 16, Line 29, Claim 16 after "score" delete "that".
Column 16, Line 43, Claim 18 after "score" delete "that".
Column 16, Line 52, Claim 19 after "first" insert -- window --.

Signed and Sealed this
Eleventh Day of December, 2018

Andrei Iancu
*Director of the United States Patent and Trademark Office*